United States Patent
Hodges et al.

(10) Patent No.: US 8,247,512 B2
(45) Date of Patent: Aug. 21, 2012

(54) METALLOCENE RANDOM COPOLYMERS WITH COOL TEMPERATURE IMPACT PROPERTIES

(75) Inventors: Owen Hodges, Houston, TX (US); Doug Burmaster, Houston, TX (US); J. Layne Lumus, Dickinson, TX (US)

(73) Assignee: Fina Technology, Inc., Houston, TX (US)

( * ) Notice: Subject to any disclaimer, the term of this patent is extended or adjusted under 35 U.S.C. 154(b) by 905 days.

(21) Appl. No.: 11/682,109

(22) Filed: Mar. 5, 2007

(65) Prior Publication Data

US 2008/0221284 A1 Sep. 11, 2008

(51) Int. Cl.
*C08F 210/06* (2006.01)
*C08F 210/02* (2006.01)

(52) U.S. Cl. ........................................ 526/348; 526/351

(58) Field of Classification Search .................. 526/348, 526/348.1, 351; 524/348, 351
See application file for complete search history.

(56) References Cited

U.S. PATENT DOCUMENTS

| | | | |
|---|---|---|---|
| 4,959,402 A * | 9/1990 | Williams et al. | 524/99 |
| 6,372,847 B1 | 4/2002 | Wouters | |
| 6,960,635 B2 * | 11/2005 | Stevens et al. | 526/161 |
| 7,138,474 B1 * | 11/2006 | McLeod et al. | 526/351 |
| 7,514,510 B2 * | 4/2009 | Marin et al. | 526/170 |
| 2003/0088022 A1 | 5/2003 | Lin et al. | |
| 2006/0128842 A1 | 6/2006 | Bumaster et al. | |
| 2006/0142497 A1 | 6/2006 | Stevens et al. | |
| 2007/0116911 A1 * | 5/2007 | Miller et al. | 428/35.7 |
| 2007/0202285 A1 * | 8/2007 | Burmaster et al. | 428/35.7 |

* cited by examiner

*Primary Examiner* — Rip A. Lee

(57) ABSTRACT

A metallocene random copolymer of propylene and ethylene in which the ductile/brittle transition temperature of a molded article made from the copolymer may be in the range of from about 20° F. (−7° C.) to about 40° F. (4° C.). The haze level of the molded article may be less than about 10 percent for an 80-mil (0.2 cm) thick plaque. The metallocene random copolymer may further include a clarifier.

12 Claims, No Drawings

METALLOCENE RANDOM COPOLYMERS WITH COOL TEMPERATURE IMPACT PROPERTIES

BACKGROUND OF THE INVENTION

1. Technical Field

The present invention relates to clear, impact resistant polymers. More particularly, the present invention relates to a metallocene random copolymer of ethylene and propylene with low haze and high impact resistance at low temperatures.

2. Background of the Art

Ziegler-Natta propylene-ethylene heterophasic copolymers (ZNICP) that exhibit good impact resistance properties at cool temperatures tend to have poor clarity while Ziegler-Natta propylene-ethylene random copolymers (ZNRCP) that exhibit poor impact properties tend to have good clarity. The undesirable impact characteristics exhibited by existing ZNRCP tend to become more pronounced at low temperatures. ZNICP that have high impact resistance at low temperatures tend to be opaque while ZNRCP that are translucent at low temperatures tend to be brittle. Thus, a need exists for a polymer material that exhibits high impact resistance at low temperatures and high clarity. The present application addresses such needs.

SUMMARY OF THE INVENTION

In one aspect, the invention is a metallocene random copolymer of propylene and ethylene, polymerized in the presence of a metallocene catalyst, wherein the metallocene random copolymer has an ethylene content of from about 1.8 weight percent to about 5 weight percent, and a melting point of from about 108° C. to about 120° C. The molded article formed from the metallocene random copolymer has a ductile/brittle transition temperature in a range of from about 20° F. (−7° C.) to about 40° F. (4° C.) and may be prepared using a bis-indenyl or a CpFlu based metallocene catalyst system.

Another aspect of the invention is a molded article prepared using a metallocene random copolymer of propylene and ethylene, polymerized in the presence of a metallocene catalyst, wherein the metallocene random copolymer has an ethylene content of from about 1.8 weight percent to about 5 weight percent, and a melting point of from about 108° C. to about 120° C. The molded article formed from the metallocene random copolymer has a ductile/brittle transition temperature in a range of from about 20° F. (−7° C.) to about 40° F. (4° C.) and may be prepared using a bis-indenyl or a CpFlu based metallocene catalyst system.

In still another aspect, the invention is food packaging, analytical equipment, translucent overmolding, or medical devices prepared using a random metallocene copolymer of propylene and ethylene, polymerized in the presence of a metallocene catalyst, wherein the metallocene random copolymer has an ethylene content of from about 1.8 weight percent to about 5 weight percent, and a melting point of from about 108° C. to about 120° C. The molded article formed from the metallocene random copolymer has a ductile/brittle transition temperature in a range of from about 20° F. (−7° C.) to about 40° F. (4° C.) and may be prepared using a bis-indenyl or a CpFlu based metallocene catalyst system.

DETAILED DESCRIPTION OF THE INVENTION

Disclosed herein is a random copolymer of propylene and ethylene catalyzed with a metallocene catalyst system that allows the random copolymer to have an elevated ethylene content and thus good impact resistance. The catalyst also may improve the clarity characteristics of the random copolymer. A clarifier may optionally be added to the random copolymer for further clarity enhancement.

The metallocene catalysts system used with the invention may be selected from those useful for olefin preparation. Such metallocene catalyst systems may be characterized generally as coordination compounds incorporating one or more cyclopentadienyl (Cp) groups (which may be substituted or unsubstituted, each substitution being the same or different) coordinated with a transition metal through pi (or π) bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example, when the valence of M is 4, m may be from 1 to 3 and n may be from 1 to 3 and n+m=4.

The metal atom "M" of the metallocene catalyst compound, as described throughout the specification and claims, may be selected from Groups 3 through 12 atoms and lanthanide group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group typically includes ring, fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, 4,5-benzindenyl, 4,5-bis-benzindenyl, fluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls, optionally containing halogens such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. In catalysts where there are two L groups, they may be bridged to each other. A bridged metallocene, for example may, be described by the general formula:

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging groups are represented by $C_1$ to $C_{20}$ alkylenes, substituted $C_1$ to $C_6$ alkylenes, oxygen, sulfur, $R_2C=$, $R_2Si=$, $—Si(R)_2Si(R_2)—$, $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl. The bridging groups may also have carbons or silicons having an olefinic substituent.

In another exemplary catalyst, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The metallocene catalysts also include the CpFlu family of catalysts (e.g., a metallocene incorporating a substituted or unsubstituted Cp fluorenyl ligand structure) represented by the following formula:

$$X(CpR^1_n R^2_m)(FluR^3_p)$$

wherein Cp is a cyclopentadienyl group; Flu is a fluorenyl group; X is a structural bridge between Cp and Flu; $R^1$ is a substituent on the Cp; n is 0, 1, or 2; $R^2$ is a substituent on the Cp at carbons 3 or 4 (a position which is proximal to the bridge); m is 0, 1, or 2; each $R^3$ is the same or different and is a hydrogen or a hydrocarbyl group having from 1 to 20 carbon atoms with $R^3$ being substituted at carbons 2, 3, 3, 4, 5, 6, or 7 (a nonproximal position on the fluorenyl group) and at least one other $R^3$, if present, being substituted at an opposed position on the fluorenyl group; and p is 0, 1, 2, 3, or 4.

Exemplary CpFlu molecules include those having a general structure such as:

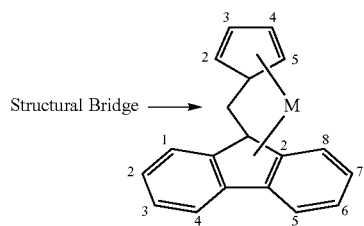

wherein M is a metal, the X in this embodiment is a methylene structural bridge. Note that all rings are aromatic notwithstanding the placement of the double bonds in the general structure.

The bis-indenyl metallocene catalysts are also useful in olefin polymerization. A bridged metallocene, the bis-indenyls may be described by the general formula:

$$XCp^A Cp^B MA_n$$

wherein X, M and A are as described above, but $Cp^A$ and $Cp^B$ each denote an indenyl group. These catalysts have been reported to be particularly useful for production of isotactic polypropylene in U.S. Pat. No. 6,414,095, the contents of which are incorporated herein by reference.

Exemplary bis-indenyl molecules include those having a general structure such as:

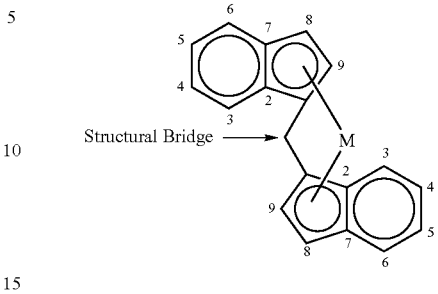

wherein M is a metal, and the X in this embodiment is a methylene structural bridge.

Another family of the metallocene catalyst includes bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. No. 6,069,213, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213, which are incorporated by reference herein.

The metallocenes may be present as racemic or meso compositions. In some embodiments, the metallocene compositions may be predominantly racemic. In other applications, the metallocenes may be predominantly meso.

Non-limiting examples of metallocene catalyst components include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(9-fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$, dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecylcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bis(n-oxtylcyclopentadienyl)zirconium$A_n$,
bis(n-pentylcyclopentadienyl)zirconium$A_n$,
bis(n-propylcyclopentadienyl)zirconium$A_n$,
bis(trimethylsilylcyclopentadienyl)zirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitaniumAn,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$, methylphenylsilyltetramethyl-
   cyclopentadienylcyclohexylamidotitaniumA$_n$,
methylphenylsilyltetramethyl-
   cyclopentadienylcycloheptylamidotitaniumA$_n$,
methylphenylsilyltetramethyl-
   cyclopentadienylcyclooctylamidotitaniumA$_n$,
methylphenylsilyltetramethyl-
   cyclopentadienylcyclononylamidotitaniumA$_n$,
methylphenylsilyltetramethyl-
   cyclopentadienylcyclodecylamidotitaniumA$_n$,
methylphenylsilyltetramethyl-
   cyclopentadienylcycloundecylamidotitaniumA$_n$,
methylphenylsilyltetramethyl-
   cyclopentadienylcyclododecylamidotitaniumA$_n$,
methylphenylsilyl(tetramethylcyclopentadienyl)(sec-butylamido)titaniumA$_n$,
methylphenylsilyl(tetramethylcyclopentadienyl)(n-octylamido)titaniumA$_n$,
methylphenylsilyl(tetramethylcyclopentadienyl)(n-decylamido)titaniumA$_n$,
methylphenylsilyl(tetramethylcyclopentadienyl)(n-octadecylamido)titaniumA$_n$,
diphenylsilyltetramethylcyc-
   lopentadienylcyclopropylamidotitaniumA$_n$,
diphenylsilyltetramethylcyc-
   lopentadienylcyclobutylamidotitaniumA$_n$,
diphenylsilyltetramethylcyc-
   lopentadienylcyclopentylamidotitaniumA$_n$,
diphenylsilyltetramethylcyc-
   lopentadienylcyclohexylamidotitaniumA$_n$,
diphenylsilyltetramethylcyc-
   lopentadienylcycloheptylamidotitaniumA$_n$,
diphenylsilyltetramethylcyc-
   lopentadienylcyclooctylamidotitaniumA$_n$,
diphenylsilyltetramethylcyc-
   lopentadienylcyclononylamidotitaniumA$_n$,
diphenylsilyltetramethylcyc-
   lopentadienylcyclodecylamidotitaniumA$_n$,
diphenylsilyltetramethylcyc-
   lopentadienylcycloundecylamidotitaniumA$_n$,
diphenylsilyltetramethylcyc-
   lopentadienylcyclododecylamidotitaniumA$_n$,
diphenylsilyl(tetramethylcyclopentadienyl)(sec-butylamido)titaniumA$_n$,
diphenylsilyl(tetramethylcyclopentadienyl)(n-octylamido)titaniumA$_n$,
diphenylsilyl(tetramethylcyclopentadienyl)(n-decylamido)titaniumA$_n$,
diphenylsilyl(tetramethylcyclopentadienyl)(n-octadecylamido)titaniumA$_n$,
and derivatives thereof.

As used herein, the term "metallocene activator" is defined to be any compound or combination of compounds, supported or unsupported, which may activate a single-site catalyst precursor compound (e.g., metallocenes, Group 15 containing catalysts, etc.) to form the metallocene catalyst system. Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as the aluminoxanes as activators. Aluminoxanes are well known in the art and can be made by conventional methods, such as, for example admixing an aluminum alkyl with water. Nonhydrolytic routes to form these materials are also known. Traditionally, the most widely used aluminoxane is methylaluminoxane (MAO), an aluminoxane compound in which the alkyl groups are methyls. Aluminoxanes with higher alkyl groups include hexaisobutylalumoxane (HIBAO) isobutylaluminoxane, ethylaluminoxane, butylaluminoxane, heptylaluminoxane and methylbutylaluminoxane; and combinations thereof. Modified aluminoxanes (e.g., "MMAO"), may also be used. The use of MAO and other aluminum-based activators in polyolefin polymerizations as activators are well known in the art.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include tri-substituted compounds, in particular, tri-substituted boron, tellurium, aluminum, gallium and indium compounds, and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorinated aryl groups, the groups being highly fluorinated phenyl and highly fluorinated naphthyl groups.

Illustrative, not limiting examples of ionic ionizing activators include trialkyl-substituted ammonium salts such as:
triethylammoniumtetraphenylboron,
tripropylammoniumtetraphenylboron,
tri(n-butyl)ammoniumtetraphenylboron,
trimethylammoniumtetra(p-tolyl)boron,
trimethylammoniumtetra(o-tolyl)boron,
tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-tri-fluoromethylphenyl)boron,
tributylammoniumtetra(pentafluorophenyl)boron,
tri(n-butyl)ammoniumtetra(o-tolyl)boron, and the like;
N,N-dialkylanilinium salts such as:
N,N-dimethylaniliniumtetraphenylboron,
N,N-diethylaniliniumtetraphenylboron, N,N-2,4,6-pentamethylaniliniumtetraphenylboron and the like;
dialkyl ammonium salts such as:
diisopropylammoniumtetrapentafluorophenylboron,
dicyclohexylammoniumtetraphenylboron and the like;
triaryl phosphonium salts such as:
triphenylphosphoniumtetraphenylboron,
trimethylphenylphosphoniumtetraphenylboron,
tridimethylphenylphosphoniumtetraphenylboron,
and the like, and their aluminum equivalents.

In yet another embodiment, an alkylaluminum may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

Other activators include those described in WO 98/07515 such as tris(2,2',2"-nonafluorobiphenyl) fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate)-4T-HF; silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins.

Other activators or methods for activating a metallocene-type catalyst compound are described in for example, U.S. Pat. Nos. 5,849,852 5,859,653 and 5,869,723; and WO 98/32775.

In general, the activator and catalyst component(s) may be combined in mole ratios of activator to catalyst component from 1000:1 to 0.5:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 10,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (e.g., Al from MAO:Zr from metallocene) ranges from 40 to 1000 in one embodiment, ranges from 50 to 750 in another embodiment, ranges from 60 to 500 in yet another embodiment, ranges from 70 to 300 in yet another embodiment, ranges from 80 to 175 in yet another embodiment; and ranges from 90 to 125 in yet another embodiment, wherein a desirable molar ratio of Al(MAO) to metallocene-metal "M" may be any combination of any upper limit with any lower limit described herein.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) *CHEMICAL REVIEWS* 1347-1374 (2000).

Metallocene catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 $m^2/g$ to 1,000 $m^2/g$, or from 100 $m^2/g$ to 500 $m^2/g$, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, desirably the NCA is first added to the support composition followed by the addition of the metallocene catalyst. In some processes, when the activator is MAO, the MAO and metallocene catalyst may be dissolved together in solution. The support is then contacted with the MAO/metallocene catalyst solution. In another embodiment of the process, MAO is first reacted with silica and then a metallocene is added to prepare a catalyst. Other methods and order of addition will be apparent to those skilled in the art.

Such processes are known in the art and disclosed in, for example, U.S. Pat. Nos. 6,777,366 and 6,777,367, both to Gauthier, et al., and incorporated herein by reference.

In one embodiment, the heterocyclic compound described above is combined with an alkyl aluminum scavenger. The alkyl aluminum compounds can remove or mitigate materials such as water and oxygen that could otherwise interfere with the metallocene catalysts. Non-limiting examples of alkylaluminums include trimethylaluminum, triethylaluminum (TEAL), triisobutylaluminum (TIBAL), tri-n-hexylaluminum, tri-n-octylaluminum, tri-iso-octylaluminum, triphenylaluminum, and combinations thereof. While most often used as scavengers, the compounds can also, in some applications, function as cocatalysts or activators also. One of ordinary skill in the art of performing metallocene catalyzed polyolefin polymerizations will be versed in selecting and employing such scavengers.

Metallocene catalysts may be supported or unsupported. Typical support materials may include talc, inorganic oxides, clays and clay minerals, ion-exchanged layered compounds, diatomaceous earth compounds, zeolites or a resinous support material, such as a polyolefin. Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 $m^2/g$ to 1,000 $m^2/g$, or from 100 $m^2/g$ to 400 $m^2/g$, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is fully incorporated by reference herein. The methods generally include reacting neutral anion precursors that are sufficiently strong Lewis acids with the hydroxyl reactive functionalities present on the silica surface such that the Lewis acid becomes covalently bound. Activators may also be incorporated onto the support, using processes such as those disclosed in, for example, U.S. Pat. Nos. 6,777,366 and 6,777,367, both to Gauthier, et al., both of which are fully incorporated herein by reference.

To prepare a polymer it is necessary, in general, to contact the monomer or mixture of monomers and the given metallocene catalyst and the described cocatalyst(s). In certain cases it is desirable that the catalyst has been preactivated. Those skilled in the art will understand that this refers to subjecting the metallocene catalyst to conditions that promote the desired interaction between the activator or cocatalyst and the metallocene. The most commonly employed method of activating a catalyst is simply heating it to a sufficient temperature and for a sufficient time, determined as a matter of routine experimentation. This is discussed further in, for example, U.S. Pat. No. 6,180,732, the disclosure of which is fully incorporated herein by reference. Other methods can be used. Those skilled in the art will appreciate that modifications in the above generalized preparation method may be made without altering the outcome. Therefore, it will be understood that additional description of methods and means of preparing the catalyst are outside of the scope of the invention, and that it is only the identification of the prepared catalysts, as defined herein, that is necessarily described herein.

The metallocene catalysts described herein may be used to make copolymers using monomers including ethylene and propylene. A variety of processes may be employed to prepare the copolymers. Among the varying approaches that may be used include procedures set forth in, for example, U.S. Pat. No. 5,525,678, which is fully incorporated herein by reference. The equipment, process conditions, reactants, additives and other materials will, of course, vary in a given process, depending on the desired composition and properties of the polymer being formed. For example, the processes discussed in any of the following patents may be useful, each of which is fully incorporated herein by reference: U.S. Pat. Nos. 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173.

The catalyst systems described herein, including the identified family of cocatalysts, may be used over a wide range of temperatures and pressures. The temperatures may be in the range of from about 20° C. to about 280° C., or from about 50° C. to about 20° C. and the pressures employed may be in the range of from 1 atmosphere to about 500 atmospheres (0.10 mPa to 50.66 mPa) or higher. Such polymerization processes include solution, bulk, gas phase, slurry phase, high pressure processes, and combinations thereof.

Examples of solution processes are described in U.S. Pat. Nos. 4,271,060; 5,001,205; 5,236,998; and 5,589,555; and are fully incorporated herein by reference.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See, for example, U.S. Pat. Nos. 4,543,399; 4,588,790; 5,028,670; 5,317,036; 5,352,749; 5,405,922; 5,436,304; 5,456,471; 5,462,999; 5,616,661; and 5,668,228 are fully incorporated herein by reference.

The reactor pressure in a gas phase process may vary from about 100 psig to about 500 psig (about 689.47 kPa to about 3,447.38 kPa), or from about 200 to about 400 psig (1378.95 kPa to 2757.90 kPa), or from about 250 to about 350 psig (1723.69 kPa to 2413.16 kPa). The reactor temperature in a gas phase process may vary from 30° C. to 120° C. in one embodiment, or 60° C. to 115° C. in an additional embodiment, or 70° C. to 110° C. or 70° C. to 95° C. in further embodiments.

Other gas phase processes contemplated by the process includes those described in U.S. Pat. Nos. 5,627,242; 5,665,818; and 5,677,375; and European publications EP-A-0 794 200; EP-A-0 802 202; and EP-B-634 421; all of which are fully incorporated herein by reference.

Slurry processes generally include forming a suspension of solid, particulate polymer in a liquid polymerization medium, to which monomers and optionally hydrogen, along with catalyst, are added. The suspension, including the polymerization diluent, may be intermittently or continuously removed from the reactor where the volatile components may be separated from the polymer and recycled, optionally after a distillation, to the reactor. The liquefied diluent employed in the polymerization medium is typically an alkane having from 3 to 7 carbon atoms, preferably a branched alkane. The medium employed should be liquid under the conditions of polymerization and relatively inert, such as hexane or, in one particularly desirable embodiment, isobutane.

The catalyst as a slurry or as a dry free flowing powder may be injected regularly to the reactor loop, which can itself be filled with circulating slurry of growing polymer particles in a monomer. Hydrogen, optionally, may be added as a molecular weight control. The reactor may be maintained at a pressure of from about 27 bar (2.7 mPa) to about 45 bar (4.5 mPa) (and a temperature of from about 38° C. to about 121° C. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of unreacted monomer and comonomers. The resulted hydrocarbon free powder can then be compounded for use in various applications. Alternatively, other types of slurry polymerization processes can be used, such stirred reactors is series, parallel or combinations thereof.

A slurry and/or polymerization process generally includes pressures in the range of 1 to 50 atmospheres (0.10 to 5.06 mPa) and even greater and temperatures of from about 0° C. to about 120° C.

A solution process can also be used. Examples of solution processes are described in U.S. Pat. Nos. 4,271,060; 5,001,205; 5,236,998; and 5,589,555, all of which are fully incorporated herein by reference.

In one embodiment the invention may be a copolymer prepared using a metallocene catalyst wherein the metallocene catalyst includes a bis-indenyl metallocene. The copolymer may be a random copolymer of propylene and ethylene. Ethylene may be present at weight percentage of from about 3 to about 5 percent. The copolymer may have a ductile/brittle transition of from about −7° C. to about 0° C. The copolymer may have a melting point of from about 108 to about 120 and, in one embodiment, has a melting point of about 114° C.

In another embodiment, the invention may be a copolymer prepared using a metallocene catalyst wherein the metallocene catalyst includes a CpFlu metallocene. The copolymer may be a random copolymer of propylene and ethylene. Ethylene may be present at weight percentage of from about 1.8 to about 3 percent. The copolymer may have a ductile/brittle transition of from about −7° C. to about 0° C. The copolymer may have a melting point of from about 108 to about 120 and, in one embodiment, may have a melting point of about 113° C.

The metallocene random copolymer may have an ethylene content, typically greater than about 2.0 weight %, alternatively greater than about 5 wt %, alternatively greater than about 6 wt %, and even about 6.5 wt %, as measured by carbon-13 nuclear magnetic resonance spectroscopy ($^{13}$C-NMR). All weight percentages (wt %) are per total weight of the copolymer. Metallocene random copolymers of the invention may be produced and marketed under the same name but different lots might have differences in the levels of ethylene and in other characteristics. As with other random copolymers, the ethylene may be in the backbone of the polymer chain, randomly inserted in the repeating propylene units.

The processes useful in preparing metallocene random copolymers having good impact resistance and high clarity are well known in the art of preparing such copolymers and may be made by using processes such as those disclosed in U.S. Pat. Nos. 5,158,920; 5,416,228; 5,789,502; 5,807,800; 5,968,864; 6,225,251; and 6,432,860; all of which are fully incorporated herein by reference. Standard equipment and procedures as are well known in the art may be used to polymerize the propylene and ethylene into the metallocene random copolymer.

A clarifier may optionally be added to the metallocene random copolymer for clarity enhancement. Since the clarifier is not necessarily included in the metallocene random copolymer, the lower limit on the amount of clarifier is 0 parts per million (ppm) by weight. The upper limit may be typically the U.S. Food and Drug Administration limit on such materials, which in this case is 4000 ppm. A desirable range for the clarifier may be 1000 ppm to 3000 ppm. A more desirable clarifier level may be about 2000 ppm. Suitable clarifiers include dibenzylidene sorbitols (CDBS), organophosphate salts, and phosphate esters. Examples of a commercially available clarifiers are Millad 3988, 3905, and 3940, powdered sorbitols available from Milliken Chemical of Spartanburg, S.C.; NA-11 and NA-21 phosphate esters available from Asahi Denka Kogyo; NC-4 from Mitsui Chemicals; HPN-68, a norbornane carboxylic-acid salt available from Milliken Chemical; and Irgaclear D or DM sorbitol based clarifiers available from Ciba Specialty Chemicals. Of course other clarifiers known to one skilled in the art for such purposes can also be used.

If the clarifier is to be included in the metallocene random copolymer, the clarifier, typically in the form of a powder or pellet, may be added to the copolymer after the polymerization process described above but before the copolymer is melted and formed into pellets. The copolymer and the clarifier are typically dry blended into a polymer blend for subsequent forming into end-use articles. Examples of apparatus suitable for blending the materials include a Henschel blender or a Banbury mixer, or alternatively low shear blending equipment of the type that typically accompanies a commercial blow molding or sheet extrusion line. The clarifier increases clarity by greatly increasing the rate of crystal formation in the copolymer. During the normal, slower crystallization process, relatively large crystals tend to form. These large crystals refract light and thus reduce the clarity of a copolymer. When the clarifier is added, the higher rate of crystal formation results in a greater number of smaller-sized crystals. The smaller crystals allow light to pass without refraction, thus increasing the clarity of the copolymer.

In addition to the clarifier, other additives may optionally be added to the metallocene random copolymer. The additives may include stabilizers, ultraviolet screening agents, oxidants, antioxidants, anti-static agents, ultraviolet light absorbents, lubricants, fire retardants, processing oils, mold release agents, coloring agents, pigments, nucleating agents, fillers, and the like. Additives may be suited for the particular needs or desires of a user or maker and various combinations of the additives may be used.

In some embodiments of the invention, the additives used may include a neutralizer such as Irganox 1076 and/or Irgafos 168, which are commercially available from the Ciba-Geigy Corporation. In other embodiments, the additive used may include Ethanox 330, an antioxidant available from Ethyl. In another embodiment, the additives used may include a hydrotalcite such as those with the trade name DHT4A, available from Kyowa Chemical Industries Co., LTD, for example. Another neutralizer that may be used with the invention is calcium stearate.

Injection-molded articles made from the metallocene random copolymer may be tested for impact resistance, strength, and clarity by the following methods or their equivalents: ASTM D3763, Standard Test Method for High Speed Puncture Properties of Plastics Using Load and Displacement Sensors (Dynatup Impact test); ASTM D1003, Standard Test Method for Haze and Luminous Transmittance of Transparent Plastics; ASTM D256, Standard Test Methods for Determining the Izod Pendulum Impact Resistance of Plastics; and ASTM D790, Standard Test Methods for Flexural Properties of Unreinforced and Reinforced Plastics and Electrical Insulating Materials. All of the above mentioned ASTM standards are fully incorporated herein by reference.

The Dynatup Impact test, ASTM D3763, may be used to determine the toughness or impact resistance of a plastic material and also its Ductile/Brittle Transition Temperature. In this test, a specimen is placed in a Dynatup drop weight impact test tower. The specimens are generally 4 inch by 4 inch (10.2×10.2 cm) plaques or 4 inch (10.2 cm) diameter disks, although actual molded materials may also be tested. A device known as a "tup" is raised to an appropriate height above the specimen and then released. The tup comprises an impact head and a load cell that may measure and electronically record data related to the impact of the tup on the specimen and the toughness of the specimen. From the moment the tup starts moving downward to the moment of impact, the Dynatup device's high-speed data acquisition system measures a variety of variables such as maximum load, energy up to the point of maximum load, energy after the point of maximum load, and total energy. Since the tup may be dropped from various heights, the speed of the tup upon impact with the specimen may be varied as desired. In the examples described herein, the speed was 28 ft/s with a 5 lb tup weight.

The Notched Izod test, ASTM D256, measures a material's resistance to breakage from a swinging pendulum (e.g., a 2 lb (0.9 kg) hammer). The standard specimen is a 2.5 inch by 0.5 inch by 0.125 inch (6.35 cm×1.27 cm×0.32 cm) bar that is typically notched near the center of one of the long sides to prevent deformation upon impact by the pendulum. The notch is typically about 0.1 inch (0.25 cm) deep. The specimen is placed in a test apparatus and a pendulum on the apparatus is allowed to swing down from a specified height and strike the notched side of the specimen. If the specimen does not break when struck by the pendulum, the test is repeated with heavier pendulums until breakage does occur. Impact strength may be calculated from the weight of the pendulum and the height from which it was released. Impact strengths are typically given in Joules per meter, foot-pounds per inch, or other appropriate units.

The Chord Flexural Modulus test, ASTM D790, determines a material's stiffness by measuring the force required to bend a sample of the material. Test specimens are typically 2.5 inch by 0.5 inch by 0.125 inch (6.35 cm×1.27 cm×0.32 cm) bars, but other sizes and shapes could be used. A test specimen is typically placed across a span and a load is applied to the center of the specimen. The load is increased until a specified deflection occurs. The flexural force is determined by the length of the span, the load, and the amount of deflection. Force is typically given in Pascals, pounds per square inch, or other appropriate units.

Many materials exhibit lower strength or impact resistance at reduced temperatures, so it may be sometimes appropriate to test materials at temperatures that simulate the intended end-use environment. A specimen may be conditioned at a specified temperature in a freezer then quickly removed, placed in a testing apparatus, and tested in one or more of the manners described above. ASTM and ISO do not specify a conditioning time or an elapsed time from the freezer to the commencement of the test but typical values are six hours of conditioning and five seconds from freezer to test commencement.

Two modes of failure, ductile failure and brittle failure, may be defined for materials that undergo impact testing. With ductile failure, the object (weight, tup, pendulum, etc.) impacting the test specimen passes through the specimen, creating a well-defined hole but leaving the remainder of the specimen largely intact. With brittle failure, the test specimen shatters. When all other parameters are equivalent, an article that undergoes ductile failure could be considered to have better impact resistance than an article that undergoes brittle failure. Since polymer-based articles tend to become more brittle as their temperature decreases, a given article might undergo ductile failure at a high temperature and brittle failure at a low temperature. The ductile/brittle transition temperature may be defined as the temperature at which the failure mode of an article changes between ductile and brittle. For some impact tests, the determination of whether a failure is ductile or brittle may be a subjective judgment, and it might not be possible to define a precise temperature at which the transition from one mode to the other occurs. Thus, a range of temperatures may be given for the ductile/brittle transition temperature. One end of the range would be the lowest temperature at which ductile failure unquestionably occurs, and the other end of the range would be the highest temperature at which brittle failure unquestionably occurs.

With the Dynatup Impact test, a more quantitative assessment of the ductile/brittle transition temperature may be possible. The values obtained from the Dynatup Impact test (such as maximum load, energy up to the point of maximum load, energy after the point of maximum load, and total energy) tend to be relatively high when ductile failure occurs and relatively low when brittle failure occurs. While it might not be possible to precisely define which results are high and which are low, a relative comparison can often be made. For example, identical test specimens could be subjected to identical impacts at varying temperatures. If the test results obtained at high temperatures are significantly higher than those obtained at low temperatures, then a ductile/brittle transition temperature could be assumed to exist somewhere between the lowest temperature at which a relatively high value occurred and the highest temperature at which a relatively low value occurred.

Dynatup Impact tests were performed at three different temperatures, 40° F. (4° C.), 32° F. (0° C.), and 20° F. (−7° C.), on injection-molded ⅛-inch (0.32 cm) thick plaques made from the copolymer. When Dynatup Impact tests were performed at 20° F. (−7° C.) on molded articles made from the metallocene random copolymer of the present invention, the results were significantly lower than those at 40° F. (4° C.) and 32° F. (0° C.). This ductile/brittle transition temperature allows molded articles from such polymer to be used in refrigerators where the temperature may be typically about 35° F. (2° C.).

Haze tests were performed using ASTM-D1003 on plaques of 20, 40, 60, and 80 mil (0.05, 0.10, 0.15, and 0.20 cm) thicknesses. The haze values are not expected to increase with decreased temperatures. Haze values may be further improved by other processing parameters, for example polishing of injection molds to reduce scratches, etc.

Standard injection-molding techniques may be used to form the metallocene random copolymer of the present invention into articles that are clear and impact-resistant at low temperatures. Compression molding, sheet extrusion, and other well-known product formation techniques may also be used to create end-use articles. The ethylene content of the copolymer gives the articles good impact resistance while the catalyst and clarifier reduce the opacity. In addition, it has been discovered that articles made from the copolymer retain their impact resistance and clarity characteristics at low temperatures. In particular, such articles are not brittle and have low levels of haze at temperatures in the range of from about 20° F. (−7° C.) to about 40° F. (4° C.). This may be a significant improvement over existing Ziegler-Natta catalyzed polypropylene copolymers, which tend to be hazy, brittle, or both at low temperatures.

The clarity and impact resistance at low temperatures exhibited by articles made from the metallocene random copolymer make such articles useful in the packaging of refrigerated food items. The clarity allows consumers to see the refrigerated products while the impact resistance prevents the packaging from shattering.

Polymers made from metallocene catalysts may tend to have lower levels of xylene solubles than polymers made from Ziegler-Natta catalysts. Thus, a material in contact with the metallocene random copolymer of the invention may be less likely to be contaminated by the copolymer than a material in contact with a Ziegler-Natta polymer. This may be important not only in the case of food packaging described above, but also in medical applications. For example, prefilled syringes sometimes need to be kept refrigerated or transported in the winter. The copolymer of the present invention, which may have a low level of xylene solubles and may be clear and impact-resistant at low temperatures, may be useful for such an application.

The invention having been generally described, the following examples are given as particular embodiments and to demonstrate the practice and advantages thereof. It is understood that the examples are given by way of illustration and are not intended to limit the specification or the claims to follow in any manner.

EXAMPLES

The following Examples are illustrative of the invention. The Sample formulations and properties are shown in Tables 1-4 below.

Example 1

A clarified copolymer of the invention, Sample 1, was prepared by dry blending a clarifier with an ethylene/propylene random copolymer. The copolymer was produced using a bisindenyl catalyst with the proper ring substitution that provides a homopolymer melting point at or above 149 C. The clarifier was MILLAD 3988, available from Milliken & Company, and was present in the clarified copolymer at a weight concentration of about 2,500 ppm.

Example 2

A second clarified copolymer of the invention, Sample 2, was prepared substantially similarly to Sample 1 in Example 1 except that the ethylene/propylene random copolymer was prepared using a CpFlu based metallocene catalyst having proper ring substitution to provide a homopolymer melting point at or above 145 C.

Comparative Example A

A comparative example, Sample A, was prepared by dry blending a copolymer, TOTAL POLYPROPYLENE Z9470, which is available from TOTAL PETROCHEMICALS USA, with sufficient MILLAD 3988 to achieve a weight concentration of the clarifier of about 2,500 ppm. The TOTAL POLYPROPYLENE Z9470 was prepared using a Ziegler-Natta catalyst and is not an example of the invention.

Comparative Example B

A second comparative example, Sample B, was prepared substantially similarly to Sample A in comparative Example A except that TOTAL POLYPROPYLENE 8573, a different polymer prepared using a Ziegler-Natta catalyst and also available from TOTAL PETROCHEMICALS USA, was used.

Comparative Example C

A third comparative example, Sample C, was prepared using TOTAL POLYPROPYLENE 4520. TOTAL POLYPROPYLENE 4520 is an impact modified copolymer available from TOTAL PETROCHEMICALS USA, and thus Sample C is not an example of the invention. Sample C was also prepared by dry blending the impact copolymer with sufficient MILLAD 3988 to achieve a clarifier concentration of about 2,500 ppm.

Testing Conditions and Methods

Each sample was tested and the results of those tests are recorded in the tables. Ethylene levels were determined by carbon-13 nuclear magnetic resonance spectroscopy ($^{13}$C-NMR). Standard bars and/or plaques, as appropriate for the type of test to be performed, were created from each of the samples by injection molding. Multiple sets of identical bars and/or plaques were made from each sample so that multiple tests could be performed.

Properties of the molded articles were obtained using the Dynatup Impact, Haze, Notched Izod, and Flexural Modulus tests. Dynatup Impact tests were performed according to ASTM D3763 at three different temperatures, 40° F. (4° C.), 32° F. (0° C.), and 20° F. (−7° C.), on injection molded ⅛ inch (0.32 cm) thick plaques to determine the Ductile/Brittle Transition Temperatures for each copolymer. The Haze, Notched Izod, and Flexural Modulus tests were performed at room temperature. Haze tests were performed on plaques of 20, 40, 60, and 80 mil (0.05, 0.10, 0.15, and 0.20 cm) thicknesses. Haze values were performed according to ASTM D1003 and reported in percent. Notched Izod tests were performed according to ASTM D256 and results are in Joules per meter. Flexural Modulus tests were performed according to ASTM D790 and results are in megapascals (MPa).

Table 1 shows the sample properties and formulations used for the tests. Table 2 shows the Ductile and Brittle Transition Temperatures for each sample. Table 3 shows Haze Properties for both non-aged and aged specimens of each sample. Table 4 shows the Notched Izod and Flex Modulus results for each sample.

TABLE 1

Copolymer Properties and Formulation

| Sample ID | [aa]Melt Flow | [bb]C$_2$% | [cc]XS | [dd]Melting Point | Irganox 1076 | Ethanox 330 | DHT4A | [ee]CaSt | Irgafos 168 |
|---|---|---|---|---|---|---|---|---|---|
| 1  | 9.1  | 4   | 4.1 | 114 | 0.01 | 0.1 | 0.03 | —    | 0.05 |
| 2  | 10.4 | 2.5 | 0.7 | 113 | 0.01 | 0.1 | —    | 0.04 | 0.05 |
| A* | 4.9  | 5.8 | 9.3 | 137 | —    | 0.1 | 0.03 | —    | 0.05 |
| B* | 6.6  | 3.4 | 6.7 | 142 | —    | 0.1 | 0.03 | —    | 0.05 |
| C* | 5.6  | —   | —   | —   | 0.01 | 0.1 | 0.03 | —    | 0.05 |

[aa]ASTM-D1238, g/10 minutes
[bb]Ethylene Percent
[cc]Xylene Solubles Content determined using ASTM-D5492, Percent
[dd]DSC ASTM-3418, °C.
[ee]Calcium Stearate
*Comparative Sample

TABLE 2

Ductile/Brittle Transition Temperature

| Ductile/Brittle Transition Temperature | Sample 1 | Sample 2 | Sample A* | Sample B* | Sample C* |
|---|---|---|---|---|---|
| °C. | −7 to 0 | 0 to 4.4 | −7 to 0 | 0 to 4.4 | 4.4 to 10 |

TABLE 3

Haze Measurements

| Plaque Thickness | Sample 1 | Sample 2 | Sample A* | Sample B* | Sample C* |
|---|---|---|---|---|---|
| Non-Aged Specimens ||||||
| 20 mil (0.05 cm) | 2.2 | 1.8 | 4.0 | 3.6 | opaque |
| 40 mil (0.10 cm) | 4.3 | 3.9 | 7.4 | 7.1 | opaque |
| 60 mil (0.15 cm) | 6.7 | 6.4 | 9.9 | 11.0 | opaque |
| 80 mil (0.20 cm) | 8.2 | 8.5 | 12.2 | 13.7 | opaque |
| Specimens Aged 96 Hours in Oven at 60° C. ||||||
| 20 mil (0.05 cm) | 7.2 | 3.0 | 30.7 | 9.0 | opaque |
| 40 mil (0.10 cm) | 10.2 | 5.3 | 16.1 | 9.2 | opaque |
| 60 mil (0.15 cm) | 15.2 | 7.8 | 25.7 | 14.2 | opaque |
| 80 mil (0.20 cm) | 19.7 | 10.4 | 25.7 | 16.1 | opaque |

TABLE 4

Other Property Measurements

|  | Sample 1 | Sample 2 | Sample A* | Sample B* | Sample C* |
|---|---|---|---|---|---|
| Notched Izod (J/m) | 4.0 | 1.3 | 8.0 | 3.2 | 2.0 |
| Flex Modulus (MPa) | 386 | 572 | 462 | 682 | 1,364 |

Comments Regarding the Examples

The examples serve to show that the metallocene random copolymers of Samples 1 and 2 may be used to prepare molded articles having balanced clarity and low temperature impact properties. The copolymer of Sample 1 has better low temperature performance, but poorer clarity, in comparison to Sample 2. Both Sample 1 and Sample 2 are, on balance, superior to the Comparative Samples for low temperature performance and clarity.

While various embodiments of the invention have been shown and described herein, modifications may be made by one skilled in the art without departing from the teachings herein. The embodiments described herein are exemplary only, and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What is claimed is:

1. A metallocene random copolymer of propylene and ethylene, polymerized in the presence of a metallocene catalyst, wherein the metallocene catalyst is a bis-indenyl metallocene catalyst wherein the metallocene random copolymer has:
   an ethylene content of about 4 weight percent;
   a melting point of from 108° C. to 120° C.; and
   wherein a molded article formed from the metallocene random copolymer has a ductile/brittle transition temperature in a range of from 20° F. (−7° C.) to 32° F. (0° C.).

2. The metallocene random copolymer of claim 1 wherein the melting point is about 114° C.

3. The metallocene random copolymer of claim 1 further comprising a clarifier in a concentration of from about 0 ppm to about 4000 ppm.

4. The metallocene random copolymer of claim 3 wherein about 1000 ppm to about 3000 ppm of the clarifier is used.

5. The metallocene random copolymer of claim 4 wherein the clarifier is selected from the group consisting of dibenzylidene sorbitols (CDBS), organophosphate salts, phosphate esters, and mixtures thereof.

6. The metallocene random copolymer of claim 1 wherein the metallocene random copolymer has a level of xylene solubles in the copolymer of from about 0.2 to about 5 weight percent based upon total weight of the metallocene random copolymer.

7. A molded article comprising the metallocene random copolymer of claim 1.

8. The molded article of claim 7 wherein the metallocene random copolymer has a haze level of less than about 10 percent for an 80-mil (0.2 cm) thick plaque.

9. The molded article of claim 7 wherein the metallocene random copolymer has a haze level of less than about 20 percent for an 80-mil (0.2 cm) thick plaque that has been aged for 96 hours in an oven at 60° C.

10. The molded article of claim 7 wherein the level of xylene solubles in the copolymer is from about 0.5 to about 2 weight percent.

11. An article comprising the random metallocene copolymer of claim 1 wherein the article is food packaging, analytical equipment, translucent overmolding, or medical devices.

12. The article of claim 11 wherein the article is prepared by molding.

* * * * *